(12) United States Patent
Bolander et al.

(10) Patent No.: US 7,509,201 B2
(45) Date of Patent: Mar. 24, 2009

(54) SENSOR FEEDBACK CONTROL FOR NOISE AND VIBRATION

(75) Inventors: Thomas E. Bolander, Flint, MI (US); Jeffrey J. Allen, Kelkheim-Fischbach (DE); Alexander J. Roberts, Commerce Township, MI (US); Keith W. Weishuhn, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 725 days.

(21) Appl. No.: 11/043,222

(22) Filed: Jan. 26, 2005

(65) Prior Publication Data

US 2006/0178802 A1 Aug. 10, 2006

(51) Int. Cl.
*B60K 41/12* (2006.01)
*F02B 75/06* (2006.01)
*G06F 17/00* (2006.01)

(52) U.S. Cl. .............................. 701/53; 701/54; 701/90; 180/65.2

(58) Field of Classification Search ................... 701/53, 701/22, 54, 101, 90; 180/65.2, 65.3; 123/399, 123/90.11, 90.15, 64
See application file for complete search history.

(56) References Cited

U.S. PATENT DOCUMENTS

| 5,597,371 | A | * | 1/1997 | Toukura | 477/111 |
| 6,579,206 | B2 | | 6/2003 | Liu et al. | |
| 7,232,401 | B2 | * | 6/2007 | Albertson | 477/2 |
| 2005/0166900 | A1 | * | 8/2005 | Song et al. | 123/481 |
| 2005/0205074 | A1 | * | 9/2005 | Gibson et al. | 123/673 |

FOREIGN PATENT DOCUMENTS

| DE | 3108374 A1 | 3/1981 |
| DE | 3624755 A1 | 1/1988 |
| DE | 10236202 A1 | 3/2003 |
| DE | 10251620 A1 | 5/2004 |

* cited by examiner

*Primary Examiner*—Tan Q Nguyen

(57) ABSTRACT

A method of controlling noise/vibration in a vehicle having a powertrain includes sensing noise/vibration in the vehicle. An operating point of the powertrain is adjusted and a constant transmission output power is maintained to reduce the noise/vibration.

23 Claims, 3 Drawing Sheets

SENSOR FEEDBACK CONTROL FOR NOISE AND VIBRATION

FIELD OF THE INVENTION

The present invention relates generally to vehicle control systems and more particularly to systems for controlling noise and vibration in vehicles.

BACKGROUND OF THE INVENTION

In some internal combustion engines, an engine control system can deactivate cylinders when engine loads are low. This process is generally referred to as variable displacement, or displacement on demand (DOD). For example, an eight-cylinder engine with DOD can be operated using four cylinders to improve fuel economy by reducing pumping losses. Operation using all of the engine cylinders is referred to as an activated mode. A deactivated mode refers to operation using fewer than all of the cylinders of the engine (i.e., one or more cylinders are not active).

While a vehicle engine is operating in a deactivated mode, the engine speeds and loads can give rise to vibrations different from those occurring in the vehicle while the engine is operating on all cylinders. It is always desirable to provide operating conditions for a vehicle that minimize noise and/or vibration that might be considered unpleasant by a driver of the vehicle. Materials and/or systems can be used to contain vibration and/or control noise in vehicle engine and/or powertrain components, but these materials and/or systems are costly and are typically controlled externally from the affected components.

SUMMARY OF THE INVENTION

The present invention, in one implementation, is directed to a method of controlling noise/vibration in a vehicle having a powertrain. Noise/vibration in the vehicle is sensed. An operating point of the powertrain is adjusted and a constant transmission output power is maintained to reduce the noise/vibration.

In another implementation of the invention, a method of controlling noise/vibration in a vehicle having a powertrain includes sensing noise/vibration while the vehicle operates in an operating range that may be conducive to noise/vibration. An operating point of the powertrain is adjusted to shift vehicle operation outside the range.

In another implementation, the invention is directed to a system for controlling noise/vibration in a vehicle having a powertrain. A vibration sensing module senses whether noise/vibration is present in the vehicle. A control module, while noise/vibration is sensed, adjusts an operating point of the powertrain while maintaining a constant powertrain output power to reduce the noise/vibration.

In yet another configuration, the invention is directed to a system for controlling noise/vibration in a vehicle having a powertrain. A vibration sensing module senses and compares noise/vibration to a threshold while the vehicle is operating in an operating range conducive to noise/vibration. A control module, based on a result of the comparing by the vibration sensing module, adjusts an operating point of the powertrain to shift vehicle operation outside the range.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
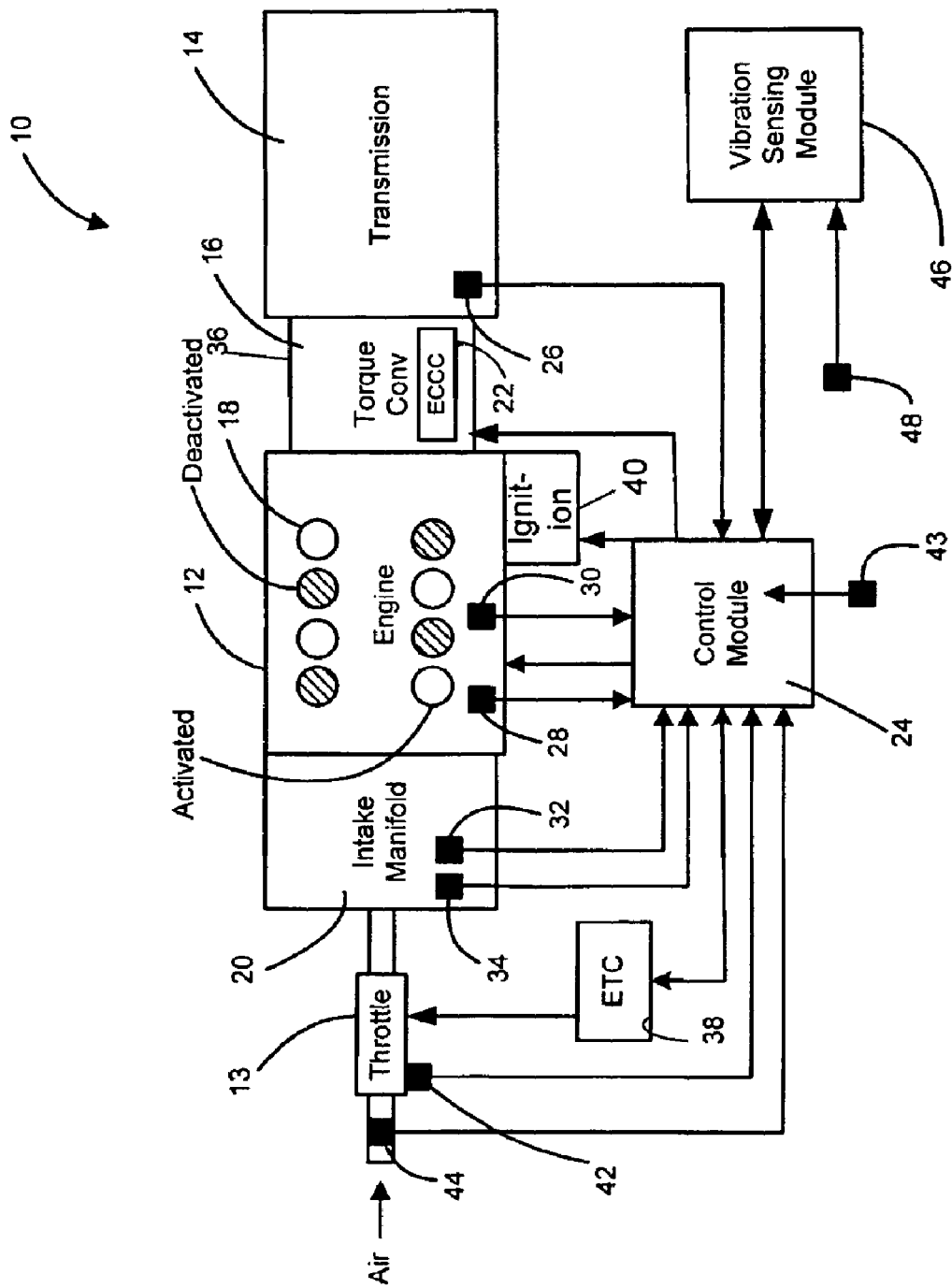
FIG. 1 is a block diagram of a vehicle control system according to one embodiment of the present invention.

The following description of various embodiments of the present invention is merely exemplary in nature and is in no way intended to limit the invention, its application, or uses. For purposes of clarity, the same reference numbers are used in the drawings to identify the same or similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality. As used herein, the term "activated" refers to operation using all cylinders of an engine. The term "deactivated" refers to operation using less than all cylinders of an engine (i.e., one or more cylinders are not active).

The present invention, in one implementation, is directed to a method that includes sensing vibration that arises in a vehicle due to variable displacement operation. It should be noted, however, that implementations also are contemplated in connection with vehicles that do not include variable displacement engines. It also should be understood that configurations of the present invention are contemplated for use in connection with engines having any type of cam placement. Additionally, configurations are contemplated for use in connection with cam-less engines.

A vehicle having a control system in accordance with one embodiment is referred to generally in FIG. 1 by reference number 10. The vehicle 10 includes an engine 12 having a plurality of cylinders 18, each with one or more intake valves and/or exhaust valves (not shown). One or more of the cylinders 18 are selectively deactivated during engine operation. When engine loading is light, the engine 12 is transitioned to deactivated mode as further described below. In an exemplary embodiment, half of the cylinders 18 are deactivated, although one or more cylinders may be deactivated. Although FIG. 1 depicts eight cylinders, it can be appreciated that the engine 12 may include additional or fewer cylinders 18. For example, engines having 4, 5, 6, 8, 10, 12 and 16 cylinders are contemplated.

The powertrain 36 provides driving power to the vehicle 10 including an engine 12, a torque converter 16 and a transmission 14. The torque converter 16 has an electronically controlled capacity clutch (ECCC) 22. The transmission 14 and torque converter clutch 22 are controlled by an engine control module 24. The control module 24 also communicates with an engine ignition system 40 and with various sensors discussed herein.

A transmission sensor 26 generates a gear signal based on a current operating gear of the transmission 14. An accelerator pedal sensor 43 generates a signal indicating accelerator pedal position that is output to the control module 24. An electronic throttle controller (ETC) 38 adjusts a throttle 13 in an intake manifold 20 based upon the accelerator pedal signal 43 and a throttle control algorithm that is executed by the control module 24. An engine speed sensor 28 generates a signal based on engine speed. An engine oil temperature sensor 30 generates a signal based on engine temperature. An intake manifold temperature signal 32 generates a signal based on intake manifold temperature. An intake manifold pressure signal 34 generates a signal based on a vacuum pressure of the intake manifold 20. Other sensor inputs used by the control module 24 include a throttle position signal 42 and an intake air temperature sensor 44.

A vibration sensing module 46 includes a sensing component 48, e.g., an accelerometer mounted on the vehicle body. The vibration sensing module 46 senses noise/vibration in the vehicle 10 and compares it to a threshold level to determine whether unacceptable noise/vibration is present. Such noise/vibration threshold may be fixed, adaptive and/or variable. The vibration sensing module 46 signals to the control module 24 whether unacceptable noise/vibration is present, and closed-loop control of noise and vibration is performed as further described below.

Figure 2:
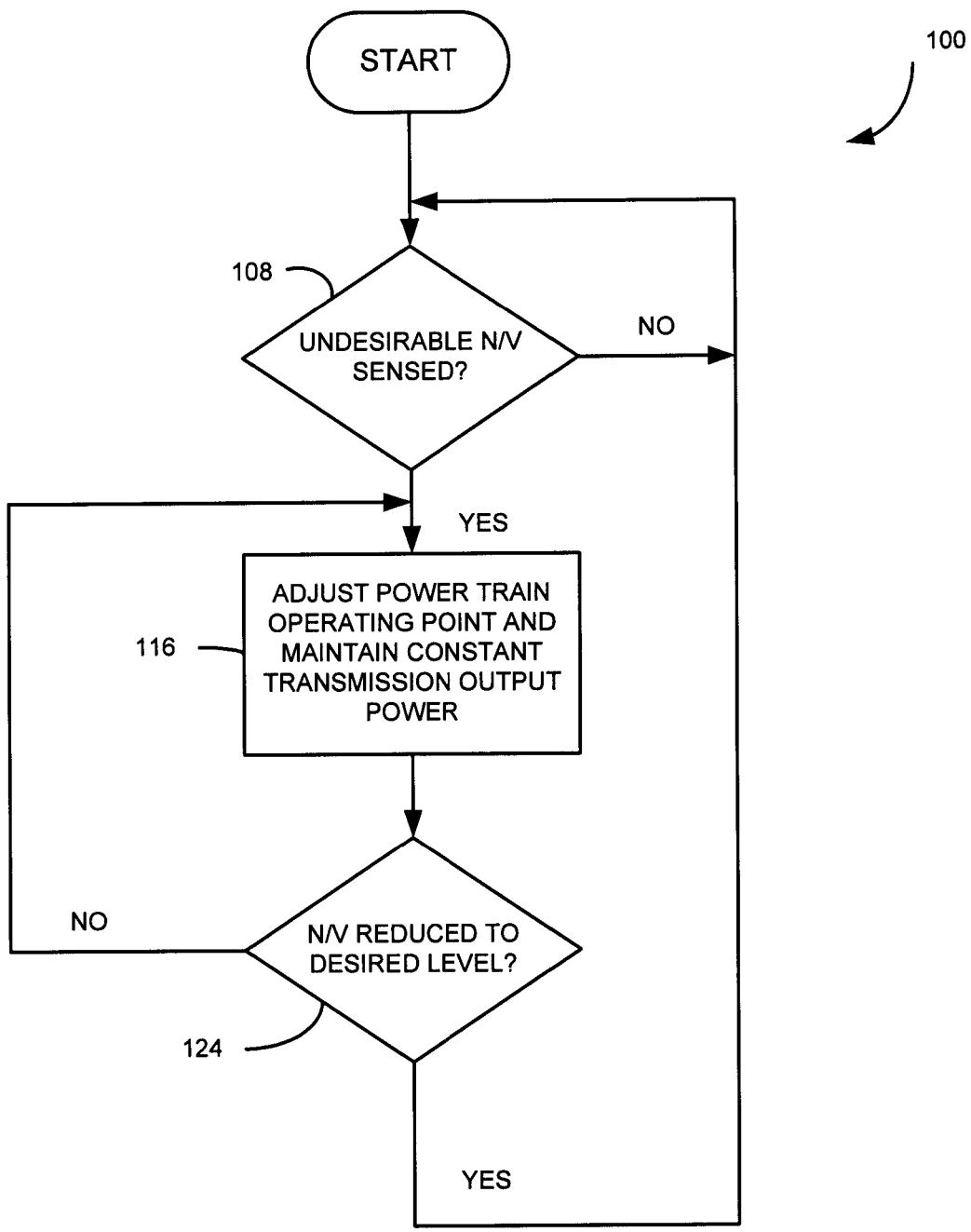
FIG. 2 is a flow diagram of a method of controlling noise/vibration in a vehicle according to one embodiment of the present invention.

A flow diagram of one implementation of a method of controlling noise/vibration in the vehicle 10 is indicated generally in FIG. 2 by reference number 100. At step 108, the control module 24 checks input from the vibration sensing module 46 to determine whether an unacceptable level of noise/vibration is present in the vehicle 10. If no such noise/vibration is detected, control returns to step 108. If noise/vibration is detected, at step 116 the control module 24 adjusts an operating point of the powertrain 36 and maintains a constant transmission output power as further described below. Input from the vibration sensing module 46 is checked at step 124 to determine whether the noise/vibration has been reduced to an acceptable level. If not, control returns to step 116 for further adjustment(s). If at step 124 the control module 24 determines that noise/vibration has been reduced to an acceptable level, control returns to step 108.

An operating point of the powertrain 36 may be adjusted in the following exemplary manner. The control module 24 may increase or decrease slip control of the ECCC 22 while coordinating such slip control with control of the ETC 38 to adjust the throttle 13. The control module 24 may also alter spark timing of the ignition system 40 and/or shift the transmission 14 to raise or lower engine speed.

In one implementation of the present invention, one or more operational ranges may be identified in which the vehicle 10 may be prone to noise/vibration. Such range(s) can be identified, for example, by maintaining historical data obtained from the vibration sensing module 46, engine speed sensor 28 and/or intake manifold pressure sensor 34. The historical data describing such ranges can be updated over time and stored, for example, in the control module 24 and/or the vibration sensing module 46.

The control module 24 and/or vibration sensing module 46 may identify an operating range in which the vehicle 10 may be prone to noise/vibration, for example, by identifying a range of engine RPMs at a given manifold air pressure in which noise/vibration data from the vibration sensing module 46 has historically reached one or more peak values. In other configurations, other or additional ways could be used to identify operational ranges in which the vehicle 10 may be prone to noise/vibration.

Figure 3:
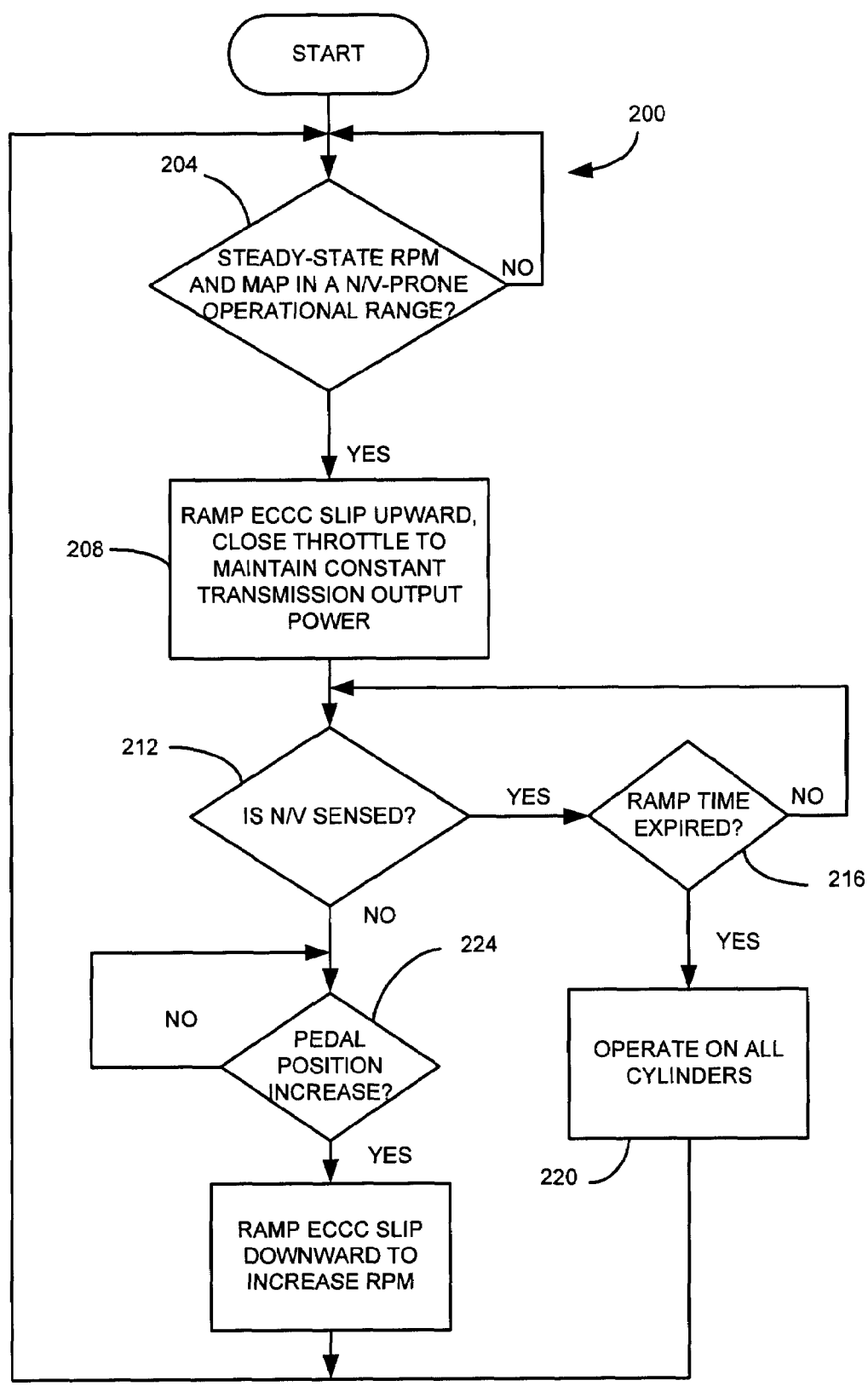
FIG. 3 is a flow diagram of a method of controlling noise/vibration in a vehicle according to one embodiment of the present invention.

A flow diagram of another implementation of a method of controlling noise/vibration, for example, in a vehicle operating in a deactivated mode, is indicated generally in FIG. 3 by reference number 200. The method 200 may be used, for example, to cause a shift in operating range of the vehicle 10, e.g., to cause the vehicle to operate outside a range in which the vehicle may be prone to noise/vibration. At step 204, it is determined whether the vehicle 10 is operating in a range in which the vehicle may be prone to noise/vibration. If, for example, the vehicle engine steady-state speed is 1705 RPM, manifold pressure is 70 kPa, and historic data indicate that the foregoing combination of speed and pressure is within an operational range in which the vehicle is prone to noise/vibration, then control passes to step 208. If it is determined at step 204 that the vehicle in not operating within such a range, control eventually passes back to step 204.

At step 208, ECCC slip is ramped upward and the throttle 13 is closed sufficiently to maintain constant transmission output power. The ramping and throttle control may cause an operating point of the vehicle to be shifted outside the operational range in which the vehicle is prone to noise/vibration. Continuing the foregoing example, while ECCC slip is ramped, e.g., from 40 rpm to 50 rpm, engine steady-state speed may increase from 1705 RPM to 1715 RPM while manifold pressure may decrease from 70 kPa to 68 kPa. The new engine steady-state speed and manifold pressure preferably are outside the operational range in which the vehicle is prone to noise/vibration.

At step 212, input from the vibration sensing module 46 is checked to determine whether unacceptable noise/vibration is present. If noise/vibration is sensed, then at step 216 it is determined whether a timer for the ramping of slip set at step 208 has expired. If slip ramping is still being performed, control returns to step 212. If slip ramping has been completed, then other actions may be taken to reduce noise/vibration. For example, at step 220 the vehicle may be caused to operate in an activated mode.

If at step 212 no noise/vibration is sensed (or alternatively, if noise/vibration is determined to be reduced to an acceptable level), the vehicle continues operating in the range to which engine operation has been shifted as previously described. If, at step 224, input from the pedal position sensor 43 indicates an acceleration, ECCC slip can be ramped downward. Continuing the above example, slip can be ramped back down to 40 rpm, thereby increasing engine speed. Since the vehicle is being driven faster, it exceeds the operational range that was avoided as previously described.

It can be appreciated that input from the vibration sensing module 46 can be used in various implementations of closed loop methods of the present invention, including but not limited to methods for adjusting a powertrain operating point. It also can be appreciated that engine speed, ECCC slip and transmission output power can be coordinated and controlled in various ways to control noise/vibration. In one implementation, signals from the foregoing sensors 48, 28 and 34 may be input over time, for example to an artificial neural network or other tool, to the control module 24 and/or vibration sensing module 46 to "teach" the control module 24 and/or vibration sensing module 46 how to optimize noise/vibration control.

Configurations of the foregoing methods and system can be used to detect engine speeds and/or load ranges that may cause noise/vibration to increase, for example, while a variable displacement engine operates in deactivated mode. Such ranges can be detected in real time, such that displacement on demand operation can be maximized without unduly compromising fuel economy or drivability. As soon as a driver presses or releases an accelerator pedal, the foregoing timed ramping, for example, of slip control provides a smooth response that is transparent to the driver.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of controlling noise/vibration in a vehicle having a powertrain, the method comprising:
    sensing at least one of noise and vibration in the vehicle; and
    adjusting an operating point of the powertrain while maintaining a constant transmission output power to reduce the at least one of noise and vibration.

2. The method of claim 1 wherein said adjusting and maintaining comprise adjusting engine speed of the vehicle using at least one of a throttle, a transmission gear and an ignition system of the vehicle.

3. The method of claim 1 further comprising:
    identifying an operational range of the vehicle in which the at least one of noise and vibration occurs; and
    performing the adjusting and maintaining to avoid operation of the vehicle in the range.

4. The method of claim 1 wherein said sensing is performed using a vibration sensing module.

5. The method of claim 1 further comprising coordinating a change in an opening of a throttle of the vehicle with a change in torque converter slip.

6. The method of claim 1 wherein the vehicle includes a variable displacement engine, said method performed while the vehicle is operated in a deactivated mode.

7. The method of claim 6 further comprising causing the vehicle to operate in an activated mode based on the sensing.

8. The method of claim 1 further comprising at least one of changing a spark timing of the engine and downshifting the vehicle.

9. A method of controlling noise/vibration in a vehicle having a powertrain, said method comprising:
    sensing at least one of noise and vibration while the vehicle operates in an operating range that may be conducive to at least one of noise and vibration; and
    adjusting an operating point of the powertrain to shift vehicle operation outside the range,
    wherein the vehicle includes a variable displacement engine, said sensing performed while the vehicle is operated in a deactivated mode.

10. The method of claim 9 wherein said adjusting comprises adjusting at least one of torque converter slip and a throttle opening of the vehicle.

11. The method of claim 9 further comprising causing the vehicle to operate in an activated mode based on said sensing.

12. The method of claim 9 wherein said adjusting is performed in a closed loop based on said sensing.

13. The method of claim 9 wherein said adjusting is performed while maintaining a constant transmission output power.

14. The method of claim 9 further comprising at least one of changing a spark timing of the engine and downshifting the vehicle.

15. The method of claim 9 wherein said adjusting comprises increasing torque converter slip while decreasing the throttle opening to maintain a constant transmission power.

16. A system for controlling at least one of noise and vibration in a vehicle having a powertrain, the system comprising:
    a vibration sensing module that senses whether noise/vibration is present in the vehicle; and
    a control module that, while at least one of noise and vibration is sensed, adjusts an operating point of the powertrain while maintaining a constant powertrain output power to reduce the at least one of noise and vibration.

17. The system of claim 16 wherein said vibration sensing module comprises an accelerometer mounted on a body of the vehicle.

18. The system of claim 16 wherein said control module adjusts at least one of torque converter slip, an opening of a throttle of the vehicle, spark timing of an ignition system, and a transmission gear of the vehicle.

19. The system of claim 16 wherein the vehicle comprises a variable displacement engine and said control module adjusts an operating point of the powertrain while the vehicle operates in a deactivated mode.

20. A system for controlling noise/vibration in a vehicle having a powertrain, said method comprising:
    a vibration sensing module that senses and compares at least one of noise and vibration to a threshold while the vehicle is operating in an operating range conducive to at least one of noise and vibration; and
    a control module that, based on a result of the comparing by said vibration sensing module, adjusts an operating point of the powertrain to shift vehicle operation outside the range,
    wherein the vehicle includes a variable displacement engine, and said vibration sensing module senses at least one of noise and vibration while the vehicle is operated in a deactivated mode.

21. The system of claim 20 wherein said control module adjusts at least one of torque converter slip and a throttle opening of the vehicle.

22. The method of claim 20 wherein said control module adjusts said operating point while maintaining a constant transmission output power.

23. The method of claim 20 wherein said control module increases torque converter slip while decreasing the throttle opening to maintain a constant transmission power.

* * * * *